B. J. ASHLEY.
APPARATUS FOR SEWAGE DISPOSAL.
APPLICATION FILED SEPT. 19, 1907.
956,665.
Patented May 3, 1910.
2 SHEETS—SHEET 1.
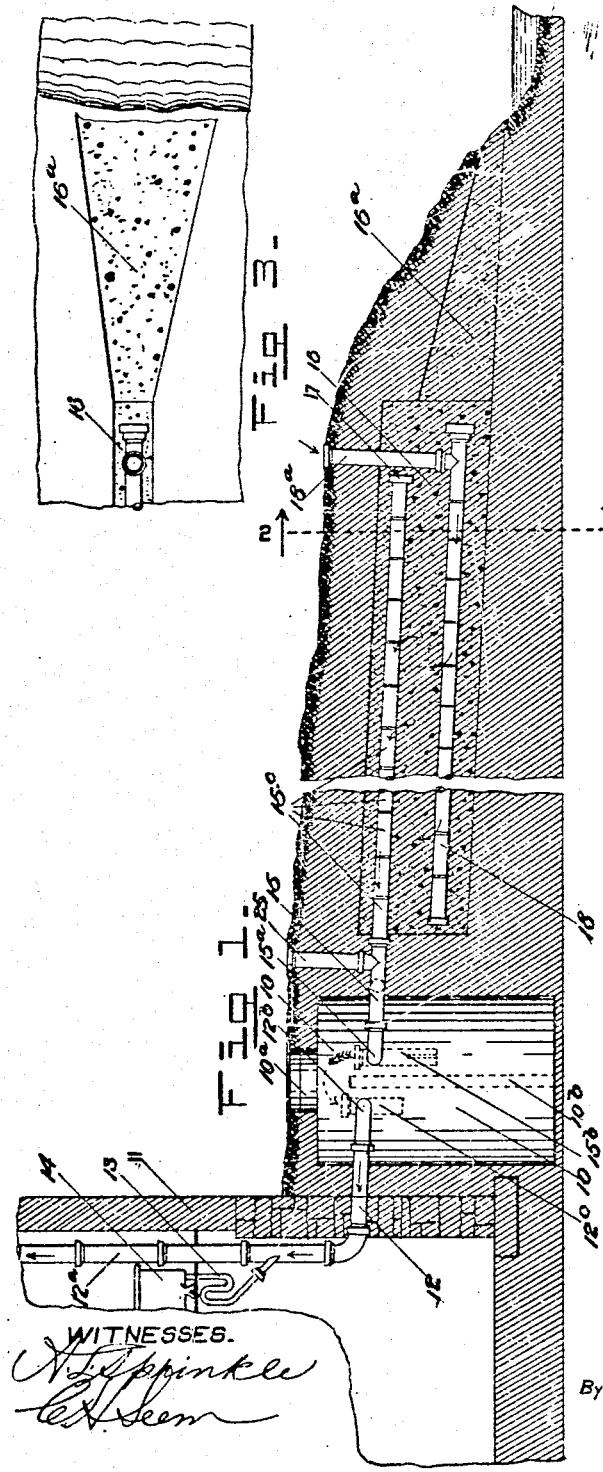
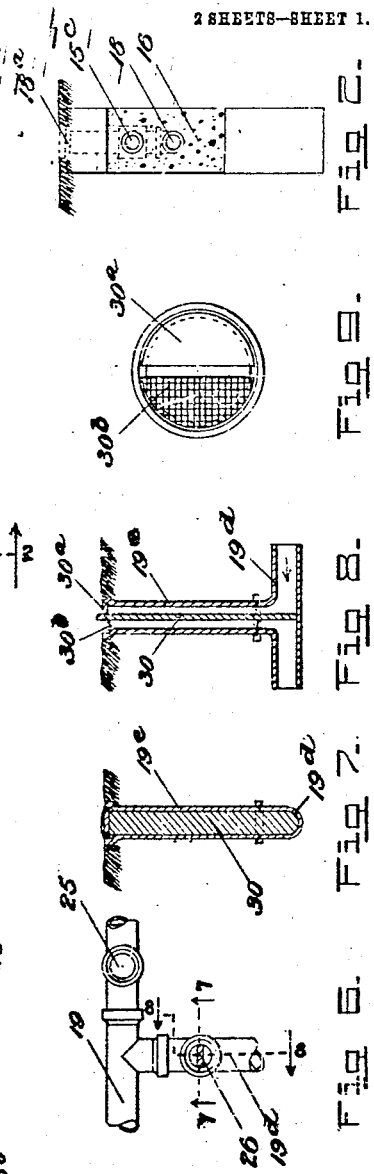
INVENTOR.
B. J. Ashley
By Brown & Jopson
ATTORNEYS.
WITNESSES.

B. J. ASHLEY.
APPARATUS FOR SEWAGE DISPOSAL.
APPLICATION FILED SEPT. 19, 1907.
956,665.
Patented May 3, 1910.
2 SHEETS—SHEET 2.
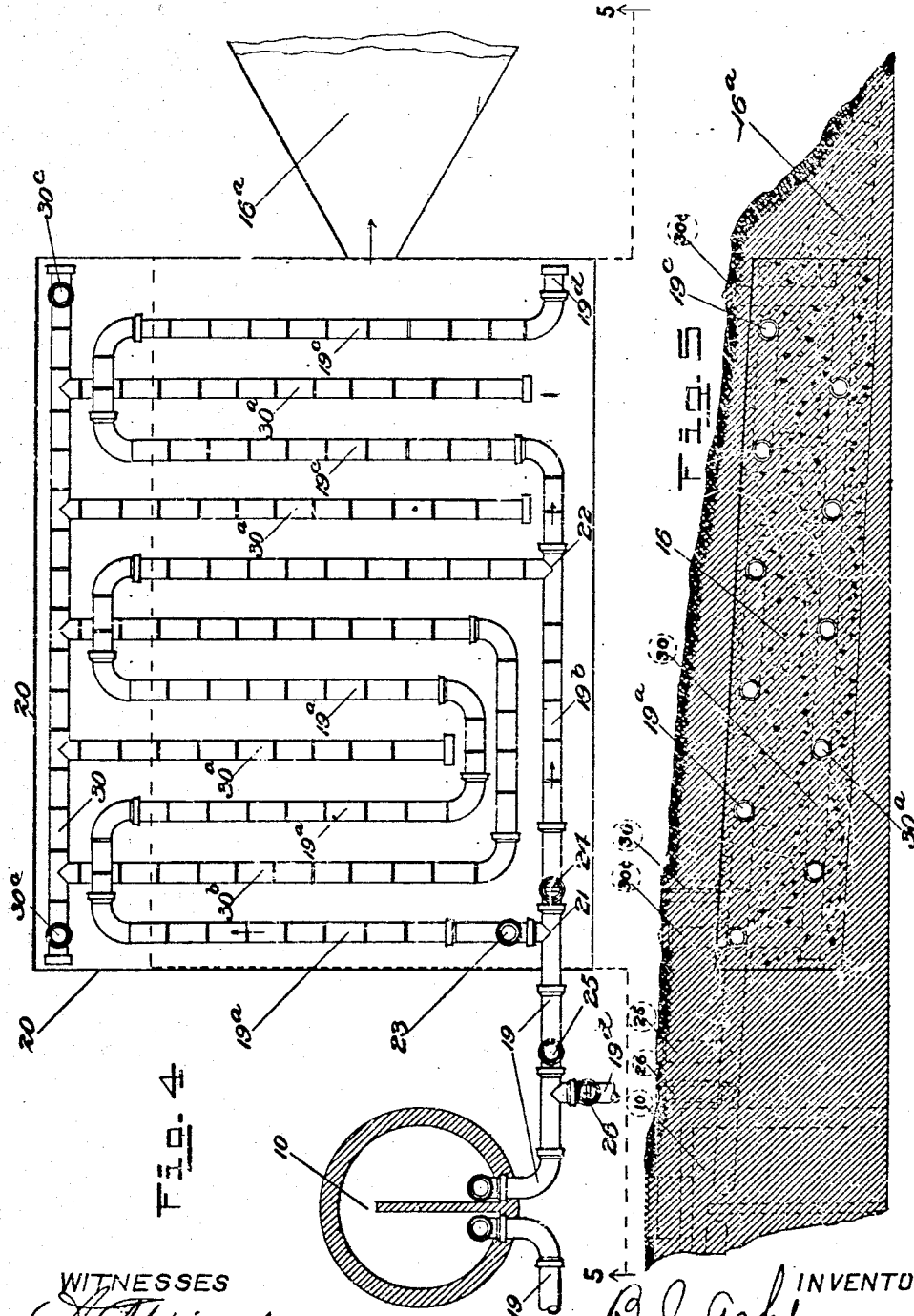

UNITED STATES PATENT OFFICE.

BURTON J. ASHLEY, OF CHICAGO, ILLINOIS.

APPARATUS FOR SEWAGE DISPOSAL.

956,665.

Specification of Letters Patent.

Patented May 3, 1910.

Application filed September 19, 1907. Serial No. 393,616.

*To all whom it may concern:*

Be it known that I, BURTON J. ASHLEY, a citizen of the United States, residing at Chicago, in the county of Cook and State of Illinois, have invented certain new and useful Improvements in Apparatus for Sewage Disposal, of which the following is a full, clear, and exact specification.

This invention relates to improvements in apparatus for sewage disposal, more particularly of that class of sewage apparatus shown and described in Letters Patent of the United States No. 848,279, issued to me March 26, 1907.

The primary object is to provide an improved form of apparatus for receiving and disposing of sewage, being more particularly adapted for use in connection with private residences, farm houses and country estates, public or private institutions, factories or the like, which are remote from municipal sewage systems, having no natural outlet or other means for disposing of sewage wastes.

A further object is to provide an improved means for sewage disposal that is simple and cheap in construction, employing common materials in connection with the natural surroundings, earth and air, and at the same time being continuous and efficient in its operation, so that when the apparatus is installed, little or no attention is required to keep it in operative condition.

A further object of the invention is to provide improved means for aerating filter beds of the general character shown and described in Patent No. 848,279, to which reference has already been made.

A further object of the invention is to provide an improved arrangement of the aerating and fluid conduits in sewage apparatus of the described character.

To the attainment of these ends and the accomplishment of other new and useful objects, as will appear, the invention consists in the features of novelty in the construction, combination and arrangement of the several parts hereinafter more fully described and claimed, and shown in the accompanying drawings, illustrating an exemplification of this invention, and in which:—

Figure 1 is a view of a complete system of sewage apparatus embodying the invention, the apparatus proper being shown in side elevation, the surrounding earth being in section, as is also a portion of a residence or other building to which the apparatus is shown applied. Fig. 2 is a vertical sectional view through the filter bed or nitrification apparatus, Fig. 3 being a plan view of the same with portions of the earth and surrounding material broken away to disclose the construction of the same. Fig. 4 is a plan view of the invention showing a modified arrangement of the filtering and nitrification apparatus. Fig. 5 is a vertical longitudinal sectional view on broken line 5—5 of Fig. 4. Fig. 6 is an enlarged detail plan view of the deflection gates appearing in the modification as illustrated in Fig. 4. Fig. 7 is a sectional view on line 7—7, Fig. 6. Fig. 8 is a sectional view on line 8—8 of Fig. 6. Fig. 9 is an enlarged detail view of the top of one of the deflection gates or cut-offs.

A cess pool or tank 10 of any suitable construction as a temporary receptacle for sewage wastes, is provided. In the construction of this tank it is preferred that it be made water tight by the application of cement or other material impervious to water and at the same time not easily affected by the action of the materials to be contained therein. It is preferred that this tank be located entirely underneath the ground. Reaching from the top of the tank to the surface of the earth is a suitable manhole 10ª. Sewage wastes are conducted to the tank from any source, as the residence, the wall of which is indicated at 11, through sewer pipe 12, which terminates in the upwardly extending soil pipe 12ª of the usual construction. Into the soil pipe 12ª sewage wastes are fed through branch pipes 13 from the usual sources of supply as the bath, indicated by the numeral 14. The pipe 12 preferably enters the tank 10 adjacent to the upper portion thereof through a side wall as at 12ᵇ which pipe terminates on the interior of the tank in the downwardly extending portion 12ᶜ.

10ᵇ indicates the usual baffle wall within the tank, which is preferably placed between the inlet and outlet openings. The outlet pipe 15 entering at 15ª also terminates on the interior of the tank in the downwardly extending portion 15ᵇ which permits the outgoing fluid to be taken from a point on the interior of the tank somewhat below the normal level of the fluid in the manner and for the purposes described in my patent to which reference has previously been made. The material in pipe 15 like that composing pipe 12 is preferably of the usual form of metallic or terra cotta sewer pipe adapted to have the joints within securely closed. The pipe 15 on leaving tank 10 enters an underground bed of filtering and purifying material 16 which is also buried beneath the surface of the soil and consisting preferably of clinkers or cinders, although if such material is not available coke, crushed stone and burnt clay, as broken brick and tile, may be used for this purpose, as may also sand and gravel, all of which, however, are not found as efficient as clinkers and coke. Pipe 15 on entering the filter bed 16 preferably terminates in a conduit formed of ordinary farm tile, usually of about the same diameter as the pipe 15 and being opened to some extent at their joints thus furnishing a means for the escape of a restricted amount of the fluid into the filtering material as the same flows through the conduit. Sections of this farm tile are indicated at 15ᶜ. This conduit preferably terminates within the bed 16, the outer end thereof may be closed as by the member 17 inserted over the end thereof. From this construction it will be apparent that it is designed that the fluid or effluent from the tank will be distributed throughout the length of the bed by escaping through the openings in the conduit.

In Patent No. 848,279 before referred to, means for aerating the filtering material and the nitrification ducts is shown by extending branches from the conduit leading directly from the tank to the surface of the earth above; that construction, however, is not found to be as efficient as the construction shown herein in which this conduit leading directly from the tank into the bed of filtering material is closed with respect to the atmosphere above.

In the embodiment of the invention as shown in Fig. 1, an aerating duct 18 composed also of farm tiles approximately parallels the conduit 15 within the filter bed and in this case is situated somewhat below it, and having the end thereof adjacent to the tank closed as well as the outer end, but being provided with one or more upwardly extending branches 18ᵃ which communicate with the atmosphere at the surface of the soil and may have their ends closed with wire screens or in any other suitable manner in order to prevent the entrance of vermin and the like into the apparatus. It will be noted that the upwardly extending air duct 18ᵃ is located adjacent to the outer extremity of the air duct 18. This is the preferable construction for the reason that it insures a complete aerification of the entire system, as with the construction herein provided the circulation of the air enters the apparatus as indicated by the arrow at the top of the passage 18ᵃ, thence passes into the air duct or tube 18 and thence through the filtering material in the bed 16 into the conduit 15. By affording this system of air circulation it will be seen that not only the conduit 15 but the surrounding material within the bed and particularly that portion of the material between the passage 18 and the conduit 15 will be thoroughly aerated.

It is found that with the construction herein shown there is no difficulty in securing a thorough circulation through the apparatus in the manner described and this is particularly true if it is possible to make the connection with the apparatus as herein shown with the soil pipe. It is apparent that the circulation of the air will be upwardly through the soil pipe and that when the conduit 12 is not filled with liquid or sewage wastes, which occurs only rarely if at all, the air will circulate through the apparatus including the tank in the direction indicated throughout the apparatus by the arrows. With the construction illustrated it will be apparent that the manhole 10ᵃ of the tank should be closed and the upper extremities of the pipes 12ᶜ and 15ᵇ on the interior of the tank should be open in order to permit the air communication between the conduit 15 and the sewer pipe 12.

In the construction of apparatus of the described character it will be found the better the provision made for securing the circulation of air in the reverse direction from which the fluid is conveyed the better will be the results attained with respect to the work accomplished in the nitrification ducts and apparatus. When it is impossible to make use of the connection herein shown with the soil pipe to expedite the circulation it will be apparent that a similar connection may be made by a branch pipe from the conduit 15 or the sewer pipe 12 extending to a chimney. When the character or contour of the soil will permit, provision may be made for conducting the purified effluent from the nitrification bed and ducts in the manner illustrated in Figs. 1 and 3 in which the extension 16ᵃ is shown preferably being of less depth than the bed 16, but gradually widening out as it decreases in thickness in the manner illustrated in Fig. 3.

The modification of the invention as shown in Figs. 4 and 5 is particularly adapted in the installation of systems of the described character where the amount of sewage to be taken care of is largely in excess of the capacity of the soil to absorb the same or of that usually generated in an ordinary private dwelling. In this modification the conduit represented by the numeral 19 terminates in an irregular formation consisting of a plurality of laps indicated by the character 19ᵃ. This construction it will be seen, permits of a thorough distribution of the effluent from the tank throughout the filter bed the confines of which are illustrated by the boundary lines 20. In the use of a large system of this character, it is desirable that means be provided for dividing the system into sections so that if desirable an entire section of the same may be thrown out of use for a given period and allowed to rest while the work of purifying the effluent is being done by another portion or section of the apparatus, and means for accomplishing this purpose is shown in this modification which shows the conduit 19 branched at 21 and in addition to the branch 19$^a$ an extension 19$^b$ is provided which connects with the lapped or folded branches 19$^a$ at 22 from which point the branches 19$^a$ and 19$^b$ are merged in the single conduit 19$^c$ which terminates at 19$^d$ where it may discharge the purified effluent in any desired manner as into a stream of water; a convenient means, however of forming a terminus at or near 19$^d$ is to construct an extension of the filter bed as heretofore described at 16$^a$ and as shown in dotted lines in Figs. 4 and 5.

In order that the arrangement of the conduit pipes as just described may be most successfully used it is preferred that gates or cutoffs 23 and 24 may be provided with the branches 19$^a$ and 19$^b$ and it is preferred that when one of the gates is closed the other is allowed to remain open. By this construction it will be seen that if the gate 24 in the conduit 19$^b$ is closed the effluent from conduit 19 will be carried past the gate 23 into the laps 19$^c$ of the conduit and may thus traverse the entire length of the pipes 19$^a$ and 19$^c$, it being understood, of course that all of these conduits are depressed as they extend outwardly from the tank in order that the passage of the fluid therethrough will be caused by the fall and the consequent action of gravity. It is found that in the use of a large system of this character there is a tendency for that portion of the conduit next the tank to be called upon to do a greater portion of the work in purifying the effluent than portions further removed. If, therefore, in the use of a system of this character it be found that the sections 19$^a$ of the conduit should become clogged or over-worked they may be given a period of rest by closing the valve or gate at 23 and at the same time opening the valve or gate at 24 thus allowing the effluent to flow immediately along conduit 19$^b$ and enter 19$^c$ at 22 without traversing that section of the conduit between 23 and 22.

A broken section of a branch 19$^d$ in the conduit 19 is illustrated in Fig. 4 and it will be apparent that a branch of this character may be utilized if desired to form a connection with another filter bed of a construction similar to that just described. When two beds of this character are used by the use of suitable valves or gates 25, 26 which may be operated from the surface of the earth, the effluent may be discharged into one or both of the systems at will, although it is preferred that when one of the beds is in use the other should be allowed to remain inactive in order to allow it to recover and become more thoroughly aerated. In this modification a somewhat different arrangement of the air supply pipes is provided as will be seen, consisting of the main duct 30 into which is tapped the branch 30$^a$ and the looped branch 30$^b$. The main air duct 30 is provided with the usual upwardly extending branches 30$^c$ leading to the surface of the soil. It will be apparent that this system of air ducts is adapted to parallel the conduit branches in order to aerate the apparatus in the same manner as described in connection with the form of the invention shown in Fig. 1. It will also be apparent that there is no immediate connection between the air ducts just described and the conduits for the effluent, thus making it necessary for the circulation of air as it passes from the effluent ducts toward the tank to be drawn through the material in the filter bed. In a manner similar to the apparatus shown in Fig. 1 in which circulation of air is secured by the use of the soil pipe of the residence. It will also be apparent that the conduit pipe 19 in the modifications described in Figs. 4 and 5 may be tapped at any point between the filter bed and the tank or beyond the tank by pipe leading to suitable means as the soil pipe shown in Fig. 1, or a chimney or other artificial means of producing the desired air circulation.

The preferred construction of the valves or gates for deflecting the effluent into either one or more filter beds at will which has been referred to as indicated by the numerals 25, 26, of Fig. 4 will now be more fully described. The construction of these valves or gates is shown in detail in Figs. 7 to 9 inclusive, in which 19$^d$ indicates a T joint or sewer pipe having the upwardly extending member 19$^e$ reaching to the surface of the ground. The valve or gate is formed by shaping a member 30, preferably of wood, in the manner indicated in Fig. 7, its width being approximately the interior diameter of the upwardly extending branch of the pipe, and its lower end being fashioned to fit the contour of the pipe 19$^d$ at the bottom. It will be seen that when this member is dropped into position as indicated in Figs. 7 and 8, the passage of fluid through the conduit will be checked or stopped. At the upper end of the valve or gate member 30 a lid is formed adapted to form a closure for the upper exposed end of the pipe 19$^e$. This lid or closure is constructed by securing to one side of the member 30 a member 30ᵃ adapted to fit approximately one-half the upper circumference of the pipe, while the other half is formed of a suitable screen 30ᵇ. Where the conduits are branched, as indicated in Fig. 6, it is preferred that the valves or gates controlling each branch, as 25, 26, be located adjacent the point of branching, in order that they may be near together, which is a convenience in manipulating them for purpose of deflecting the effluent alternately from one branch to the other. It is preferred that only one gate constructed as the member 30 be employed to serve at each branch, for when one of the branches is closed, it will be apparent that the other branch should be open. The exposed end of the pipe leading to the surface of the ground from the open conduit may be closed with any simple form of lid adapted to form a complete closure not admitting a passage of air. It will be apparent that the peculiar construction described at the upper end of the gate 30 is adapted to permit the passage of air on one side of the gate, and to serve as a complete closure on the other side. When the conduit leading to a filter bed is closed, and hence the filter bed is resting, it is desirable that there be as free circulation of air as possible through the bed, which is accomplished by turning the gate 30 so that the screen closure member 30ᵇ is on the side adjacent the bed. The tight closure member 30ᵃ will then be on the other side, thus causing a draft from the tank soil pipe, chimney or other means for securing a draft to be effective in the filter bed which is active or receiving effluent.

What I claim as new is:—

1. The combination in an apparatus for the purification of sewage, of a perforated pipe or passage buried below the surface of the soil, a body of filtering material in contact with said perforated pipe or passage, the said perforated pipe or passage communicating with the source of sewage, but closed to the inlet of air except through the filtering material, an air passage communicating with said filtering material and means for exhausting the air from the filter bed.

2. The combination in an apparatus for the purification of sewage, of a receiving tank and aerating and purifying means adapted to receive the overflow from said tank, said means comprising a perforated pipe or passage buried below the surface of the soil, a bed of filtering material in contact with said perforated pipe or passage, the said perforated pipe or passage communicating with the source of sewage, but closed to the inlet of air except through the filtering material, an air passage communicating with said filtering material and means for exhausting the air from the filter bed.

3. The combination in an apparatus for the purification of sewage, of a receiving tank and aerating and purifying means adapted to receive the overflow from said tank, said means comprising a perforated pipe or passage extending beneath the surface of the earth embedded in a bed of filtering material having direct contact with the surrounding soil, an air passage and means for exhausting the air from the filter bed communicating with said filtering material but not in direct communication with said perforated pipe or passage.

4. The combination in an apparatus for the purification of sewage, of a perforated pipe or passage buried below the surface of the soil and embedded in a bed of filtering material, the said perforated pipe or passage communicating with the source of sewage, but closed to the inlet of air except through the filtering material, an air passage leading from the surface of the earth to the bed of filtering material whereby the air before entering the said perforated pipe or passage traverses the said air passage and the filtering material and means for exhausting the air from the filter bed.

5. The combination in an apparatus for the purification of sewage, of a receiving tank and aerating and purifying means comprising a perforated pipe or passage leading from said tank and traversing an underground bed of filtering material, said pipe or passage communicating with the source of sewage, but closed to the inlet of air except through the said filtering material, and a perforated air passage traversing said filtering material adjacent the pipe or passage leading from the tank, means for supplying air to the said perforated air passage and means for exhausting the air from the said perforated pipe or passage leading from the tank whereby a current of air is induced through the said apparatus traversing successively the perforated air passage, the filtering material, and the perforated pipe or passage leading from the tank.

6. In an apparatus for the purification of sewage the combination of a receiving tank and aerating and purifying means adapted to receive the overflow from said tank, said means comprising a pipe or passage provided with perforated walls extending beneath the surface of the soil and surrounded by a bed of filtering and purifying material, there being no means for supplying air to the said pipe or passage except through the medium of the filtering and purifying material, an air passage leading from the surface of the soil to the said filtering and purifying material and means for exhausting the air from the filter bed.

7. In an apparatus for the purification of sewage, the combination with a receiving tank and an underground bed of filtering or purifying material, of a pipe or passage leading from the said tank and traversing the said filtering and purifying material and communicating with the source of sewage, but closed to the inlet of air except through the said filtering and purifying material, an air passage communicating with the atmosphere at the surface of the soil and traversing said filtering and purifying material adjacent the said passage leading from the tank whereby communication between the said passages is afforded only through the filtering and purifying material and means for exhausting the air from the filter bed.

8. In an apparatus for the purification of sewage, the combination with an underground bed of filtering material in direct contact with the surrounding soil, of a fluid conduit traversing the said filtering material and provided with perforations communicating with the source of sewage, but closed to the inlet of air except through the said filtering material, a perforated air passage traversing the said filtering material adjacent the said fluid conduit but spaced therefrom, and means for supplying air to the said perforated air passage.

9. In an apparatus for the purification of sewage the combination with an underground bed of filtering material in direct contact with the surrounding soil, of a fluid conduit traversing the said filtering material, being arranged therein in a series of folded or lapped spaced sections, and means whereby fluid entering the said conduit may be required to traverse the entire length thereof or may be deflected into a designated section thereof.

10. In an apparatus for the purification of sewage, the combination with a receiving tank of an underground bed of filtering material in direct contact with the surrounding soil, of a conduit leading from the said tank and traversing the filtering material, the said conduit being perforated within the bed of filtering material and traversing the same in a series of spaced laps or folds, and means whereby the said conduit may be closed to exclude the entrance of fluids into a designated portion thereof while at the same time the discharge is deflected into the remainder of the spaced laps or folds.

11. In an apparatus for the purification of sewage, the combination with an underground bed of filtering material in direct contact with the surrounding soil, of a fluid conduit traversing the said filtering material, an air passage traversing the filtering material adjacent the fluid conduit but spaced therefrom, means for supplying air to the said air passage, and means for exhausting the air from the said fluid conduit whereby a current of air is induced through the apparatus traversing successively the air passage, the filtering material and the fluid conduit.

12. In an apparatus for the purification of sewage the combination with a conduit for feeding a plurality of filter beds, branches leading from the said conduit, cut-off pipes tapped into the said branches adjacent their point of connection with the conduit and a gate or valve adapted for insertion in the said cut-off pipes and having one end fashioned to form a closure in the branch pipe, there being a closure member secured to the other end of the gate adapted to close the outer end of the cut-off pipes.

13. In an apparatus for the purification of sewage the combination with an underground conduit, of a cut-off pipe leading from the said conduit to the surface, the diameter of said cut-off pipe being approximately the same as the diameter of the conduit, a gate being in width approximately the diameter of the said conduit and cut-off pipe and in length adapted to extend from the surface to the bottom of the conduit, and closure members secured to the upper end of the gate comprising a member on one side of the gate adapted to close the cut-off pipe, and a screen on the other side of the gate adapted to permit the circulation of air through the cut-off pipe and conduit on the adjacent side of the gate.

14. In an apparatus for the purification of sewage, the combination with an underground conduit, of a cut-off pipe leading from said conduit to the surface, the diameter of said cut-off pipe being approximately the same as the diameter of the conduit, a gate adapted to extend from the surface to the bottom of the conduit, the said gate being in width approximately the diameter of the said conduit and cut-off pipe, a closure member secured to the upper end of the gate whereby the cut-off pipe on one side of the gate is closed, and a screen adapted to permit the circulation of air through the unrestricted portion of the cut-off pipe.

15. In an apparatus for the purification of sewage the combination of a perforated pipe or passage buried below the surface of the soil, a body of filtering material in contact with said perforated pipe or passage, the said filtering material having direct contact with the surrounding soil, means for supplying air to the filtering material and an auxiliary stratum of filtering material extending to the surface of the soil whereby the filtering material may be drained of any superfluous moisture or effluent.

16. In an apparatus for the purification of sewage, the combination of a perforated pipe or passage buried below the surface of the soil, a body of filtering material in contact with said perforated pipe or passage, the said filtering material having direct contact with the surrounding soil, means for supplying air to the filtering material, and an auxiliary stratum of filtering material extending from the main body thereof to a point adjacent the surface of the soil whereby the main body of the filtering material may be drained of any superfluous moisture or effluent.

17. In an apparatus for the purification of sewage, the combination with a tank, a perforated pipe or passage leading therefrom, a filter bed in contact with said pipe, an auxiliary stratum of filtering material leading from the main body therefor to a point adjacent the surface of the soil whereby the filter bed may be drained of any superfluous moisture or effluent.

18. In an apparatus for the purification of sewage, the combination with a tank, a perforated pipe or passage leading therefrom, a filter bed in contact with said pipe, and an auxiliary stratum of filtering material extending from the main body thereof to a point adjacent the surface of the soil increasing in width outwardly from the said main body and decreasing in thickness in order that the said stratum may retain approximately a constant area in cross section.

19. In an apparatus for the purification of sewage, the combination with a conduit for feeding a plurality of filter beds, branches leading from said conduit, cut-off pipes tapped into said branches adjacent their point of connection with the conduit, a gate or valve adapted for insertion in the said cut-off pipes and having one end fashioned to form a closure in the said branch pipes, and a closure member secured to the other end of the gate whereby the outer end of the cut-off pipes may be closed on the sides thereof leading to the conduit and at the same time left open for circulation between the atmosphere at the surface of the soil and the filter bed.

20. In an apparatus for the purification of sewage, the combination of a filter bed embedded in the earth, means for discharging sewage into the filter bed, said means having communication only with the filter bed and the source of supply of said sewage, means for supplying air only to the filter bed, and means whereby the air may be exhausted from the filter bed.

21. The combination in an apparatus for the purification of sewage, of a perforated pipe or passage buried below the surface of the soil, a body of filtering material in contact with said perforated pipe or passage, the said pipe or passage communicating with the source of sewage, but closed to the inlet of air except through the filtering material, an air passage communicating with said filtering material for supplying the air thereto, and means whereby the air may be exhausted from said filtering material.

22. The combination in an apparatus for the purification of sewage, of a receiving tank and aerating and purifying means adapted to receive the overflow from said tank, said means comprising a perforated pipe or passage buried below the surface of the soil, a bed of filtering material in contact with said perforated pipe or passage, the said perforated pipe or passage communicating with the source of sewage, but closed to the inlet of air except through the filtering material, an air passage communicating with said filtering material for supplying air thereto, and means whereby the air may be exhausted from the filtering material.

23. The combination in an apparatus for the purification of sewage, of a receiving tank and aerating and purifying means adapted to receive the overflow from said tank, said means comprising a perforated pipe or passage extending beneath the surface of the earth embedded in the bed of filtering material having direct contact with the surrounding soil, an air passage communicating with said filtering material but not in direct communication with said perforated pipe or passage for supplying air to the filtering material, and means whereby the air may be exhausted from the filtering material.

24. In an apparatus for the purification of sewage, the combination of a perforated pipe or passage buried below the surface of the soil, a body of filtering material in contact with said perforated pipe or passage, the said filtering material having direct contact with the surrounding soil, means for supplying air to the filtering material, an auxiliary stratum of filtering material extending to the surface of the soil whereby the filtering material may be drained of any superfluous moisture or effluent, and means whereby the air may be exhausted from the filtering material.

In testimony whereof I have signed my name to this specification, in the presence of two subscribing witnesses, on this 16 day of Sept., A. D. 1907.

BURTON J. ASHLEY.

Witnesses:
M. W. CANTWELL,
A. L. SPRINKLE.